United States Patent [19]
Schindler et al.

[11] Patent Number: 6,109,532
[45] Date of Patent: Aug. 29, 2000

[54] LOCOMOTIVE CAB HEATING SYSTEM

[75] Inventors: Curt E. Schindler, Centerville; Marc A. Richard, Springboro; Donald E. Graham, Dayton, all of Ohio

[73] Assignee: Dayton-Phoenix Group, Inc., Dayton, Ohio

[21] Appl. No.: 09/060,794

[22] Filed: Apr. 15, 1998

Related U.S. Application Data

[60] Provisional application No. 60/042,024, Apr. 17, 1997.

[51] Int. Cl.[7] .................................................. G05D 23/00
[52] U.S. Cl. .............................................................. 237/2 A
[58] Field of Search ................................. 237/2 A, 12.6; 392/350, 360, 379; 219/480, 486, 508

[56] References Cited

U.S. PATENT DOCUMENTS

| | | | |
|---|---|---|---|
| 3,855,450 | 12/1974 | O'Connor | 219/367 |
| 5,090,617 | 2/1992 | Swan et al. | 236/3 |
| 5,367,601 | 11/1994 | Hannabery | 392/307 |
| 5,488,218 | 1/1996 | Olsen et al. | 219/492 |
| 5,792,427 | 8/1998 | Hugh et al. | 422/109 |

Primary Examiner—Henry Bennett
Assistant Examiner—Derek S. Boles
Attorney, Agent, or Firm—Thompson Hine & Flory LLP

[57] ABSTRACT

A locomotive cab heating system having a plurality of separately actuated heating units housed in a supply air duct and connected to a microcontroller. Preferably, the system includes a high temperature shutdown thermostat. The microcontroller is equipped with memory storing a program that is configured to control the microcontroller to turn on and off a predetermined number of the heating units responsive to temperature readings received from the temperature sensor, thereby maintaining air temperature in the duct within a selected range, regardless of fan speed and air flow rate. By controlling the number of heating units in operation at any given time, the heating system of the present invention controls the heat delivered to a locomotive cab more effectively, thereby ensuring the comfort of the occupants of the cab. The locomotive cab heating system of the present invention is designed to be easily and inexpensively retrofitted to preexisting heating systems.

23 Claims, 2 Drawing Sheets

LOCOMOTIVE CAB HEATING SYSTEM

CROSS-REFERENCE TO RELATED APPLICATIONS

This application claims priority from U.S. Provisional Application No. 60/042,024 filed Apr. 17, 1997.

BACKGROUND

The present invention relates to heating systems, and more particularly, to systems for controlling heat in a locomotive cab.

Heating systems for the cabs of locomotives typically are unsophisticated, consisting of a motor driven blower, ductwork connecting the blower to the cab, and several heating elements which can be activated to heat the air supplied by the blower. With such systems, the occupant of a locomotive cab controls the temperature in the cab by adjusting the blower setting and/or adjusting a heat setting which activates one or more heating elements, roughly providing high, medium or low heat. A disadvantage with such systems is that even a high heat/high blower setting resulted in a high volume of relatively cool, high velocity air being blown into the locomotive cab through supply ducts, which is perceived to be uncomfortable by the occupants of the cab.

Accordingly, there exists a need for a locomotive cab heating system which can be easily retrofitted to replace such prior art systems, and which has improved heating performance and control. Preferably, such a system is adjustable by the operator to maintain a comfortable temperature level without the necessity of making large adjustments to the blower speed, and therefore the volume flow rate of air supplied to the cab.

SUMMARY OF THE INVENTION

The present invention is a heating system for a locomotive cab which is designed to be retrofitted onto a preexisting heating system of a type having a motor driven blower that delivers air through ducts into the cab, and which includes a plurality of individual heating units in the cab supply ductwork to heat the air delivered to the cab. Such preexisting heating systems typically include a blower having a motor that can be set by a user to a desired one of several blower speeds to vary the rate of air flow into the cab.

The present invention is a system for activating the individual heating units and monitoring the duct air temperature such that the air delivered to the cab is maintained within predetermined limits regardless of the rate of air flow (i.e., fan blower speed setting), the limits being below the preset automatic shutdown air temperature. As a result, the temperature of the air emitted from the heating ducts in the locomotive cab is maintained automatically within a comfortable range for the cab occupants, regardless of the fan blower setting.

The heating system of the present invention includes a thermistor in the supply air ductwork to the locomotive cab downstream of the heating units. The thermistor produces an analog signal which is converted to a digital signal that is read by an onboard microcontroller which controls the actuation of the heating units. The microcontroller is equipped with EEPROM memory which stores a software program that actuates groups of heating units (i.e., two, four or all six heating units in a standard six-unit system) depending upon the temperature of the air flowing through the ductwork.

Accordingly, it is an object of the present invention to provide a locomotive cab heating system in which the supply air temperature is maintained within a predetermined range; a heating system which provides automatic delivery of maximum heat to the locomotive cab for a given motor for a given air flow; a heating system which delivers air at a desired flow rate and temperature without a risk of the system shutting down as a result of overheating; a heating system in which the temperature of the air supplied to the locomotive cab is controlled without the necessity of a thermostat within the cab itself and without requiring extensive redesign and refitting of preexisting systems; and a heating system which is relatively inexpensive and can be retrofitted to existing, conventional locomotive cab heating systems.

Other objects and advantages will be apparent from the following description, the accompanying drawings and the appended claims.

DETAILED DESCRIPTION

Figure 1:
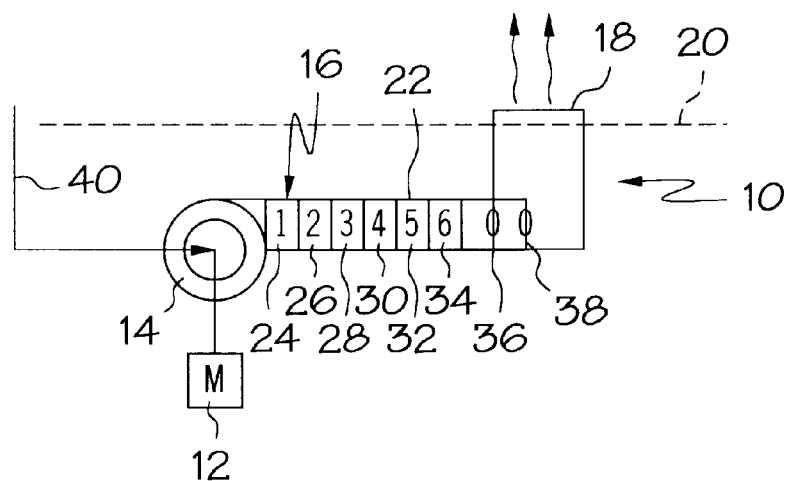
FIG. 1 is a schematic diagram of the preferred embodiment of the present invention.

As shown in FIG. 1, the locomotive cab heating system of the present invention, generally designated 10, includes a fan motor 12 which powers a fan blower 14 that discharges into a supply duct, generally designated 16, that directs air through a vent 18 into a cab 20 of a locomotive. Mounted within a straight run 22 of ductwork 16 are six heating units 24, 26, 28, 30, 32, 34 which are separately actuated. A high level shutdown thermostat 36 is also mounted in the ductwork 22 downsteam of the heating units 24–34. In addition, a thermistor 38 is also mounted adjacent to the thermostat 36. A return air duct 40 leads from the cab 20 into the intake of the fan blower 14.

Figure 2:
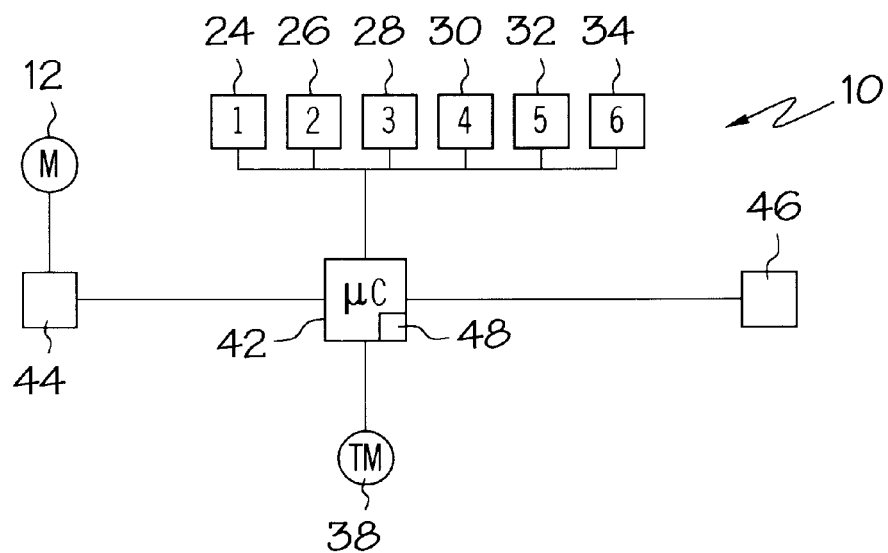
FIG. 2 is a schematic diagram of the interconnection of the microcontroller with the components of the invention shown in FIG. 1.

As shown in FIG. 2, a micrococontroller 42 is connected to an electronics package 44 that actuates the motor 12 of the fan blower 14 (FIG. 1). The microcontroller also receives discrete switch input from a fan blower control 46, typically mounted within the cab 20 (FIG. 1). Microcontroller 42 is programmed to activate a different maximum number of heating elements 24–34 for each discrete blower speed setting. For example, for a low fan setting, the maximum number of heating elements activated may be four, or alternately six units. Microcontroller 42 also receives an analog input from the thermistor 38 (FIG. 1). Analog input from thermistor 38 is converted to a digital signal by the microcontroller 42. The microcontroller 42 also actuates heating units 24–34. Thermostat 36, which is a high level shutdown thermostat, is not connected to the microcontroller 42, but rather is connected to shut off a circuit breaker which shuts off power to the heating units 24–34 by a separate system (not shown).

Figure 3:
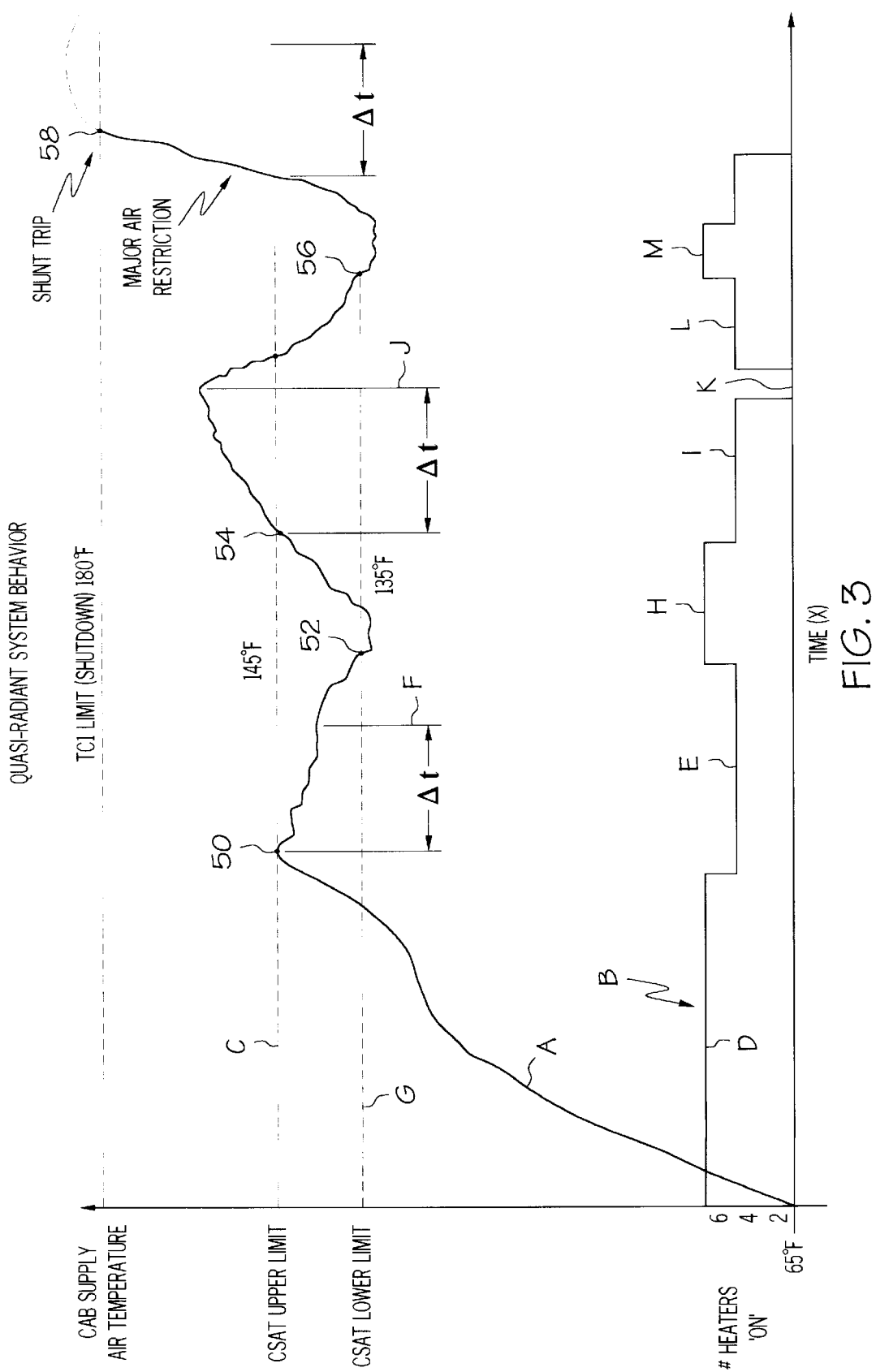
FIG. 3 is a graphical depiction of the algorithm of the microcontroller, showing the temperature ranges and activation of the heating units of the system of FIG. 1.

The microcontroller 42 is programmed with an algorithm stored in EEPROM 48, which is part of the microcontroller 42. The algorithm is shown graphically in FIG. 3. Line A in FIG. 3 represents the temperature sensed by thermistor 38 and communicated to microcontroller 42. Line B represents the number of heating units 24–34 that are actuated by microcontroller 42 at a given time. In a preferred embodiment, groups of heating units are actuated, preferably groups of two, such as units 24, 26; 28, 30; and 32, 34 (see FIG. 1). The pairs of heating units that are actuated by microcontroller 42 are represented by the numbers along the vertical axis of the graph of FIG. 3. The horizontal ("X") axis represents an arbitrary time period of operation of the system 10.

The operation of the locomotive cab heating system 10 of the present invention is as follows. The heating system 10 is actuated by an occupant in the cab 20 and the thermistor 38 measures the ambient air temperature within the duct 16. This temperature is represented by line A and, for this example, begins at 65° F. (18° C.) (FIG. 3). The thermistor 38 signals the microcontroller 42 that the temperature is below a value, stored in EEPROM 48, which is the upper limit of the desired temperature range, represented by dashed line C, and accordingly, the microcontroller 42 actuates substantially all, or in this particular embodiment, all six heating units 24–34, as represented by line segment D. As the temperature rises in response to the heat input by heating units 24–34, it reaches the upper limit at 50 which intersects line C. In a preferred embodiment, this temperature is 145° F. (63° C.). At that time, the microcontroller shuts off one pair of heating units, such as units 32, 34, so that two pairs of heating units (or four heating units 24–30) are activated, which is represented by line segment E. A wait or monitoring period Δt transpires, typically on the order of 20–30 seconds, represented by interval F. This wait period F is a part of the algorithm and is triggered when the temperature signal by thermistor 38 reaches line C on the rise. At this time, the temperature at thermistor 38 may begin to drop, but so long as the temperature is below the line C, and above the lower temperature limit represented by broken line G (preferably 135° F. (57° C.)), the system maintains its current mode of operation, that is, with four heating units 24–30 activated.

When the temperature sensed by thermistor 38 drops below line G, such as at point 52, the microcontroller 42 will actuate the then unused third pair of heating units 32, 34 represented by line segment H, which results in an increase in the temperature of the air within the duct 16. Should the temperature rise above the upper limit represented by line C, such as at point 54, the system 10 again shuts down heating units 32, 34 represented by line segment 1, for another monitoring period Δt at J. After time interval J, if the temperature remains above the upper limit, represented by line C substantially all, or in this particular embodiment, all units 24–34 are shut off by microcontroller 42, a condition represented by line segment K.

When the temperature in the duct 16 drops below the temperature represented by line C, indicating a duct air temperature within the desired range, four heating units 24–30 are then actuated, represented by line segment L. Should the temperature continue to drop below the lower limit at point 56, the microcontroller 42 will then actuate the remaining two unused units 32, 34, represented by line segment M. Thereafter, if the temperature rises for any reason above the shutdown limit, represented by point 58, the shunt trip connection of thermostat 36 will shut the entire system 10 down. Such a temperature rise may be caused by a major air restriction, such as the blockage of supply air ducts to the cab 20 of the locomotive, or a failure of fan blower 14.

As shown in FIG. 3, the operation of the heating system 10 limits the supply air temperature of the heating system substantially within a predetermined temperature range, such as between 135° F. and 145° F. (57° C. and 63° C.) as shown in the figure. In the preferred embodiment, the temperature sampling occurs at periodic time intervals, on the order of 5 milliseconds, although different time intervals can be employed without departing from the scope of the invention.

While the form of apparatus herein described constitutes a preferred embodiment of the invention, it is to be understood that the invention is not limited to this precise form of apparatus, and that changes may be made therein without departing from the scope of the invention.

What is claimed is:

1. A locomotive cab heating system comprising:
   a fan;
   a supply duct connected to the fan to convey air from the fan to a locomotive cab;
   a plurality of separately actuated heating units positioned in the supply duct to heat air from the fan in the duct;
   a temperature sensor positioned into the supply duct;
   a microcontroller operatively connected to the fan, the heating units, and the temperature sensor; and
   a memory device storing a program configured to control the microcontroller to perform the steps of:
      obtaining a temperature reading from the temperature sensor;
      switching on substantially all of the heating units responsive to the temperature reading being below a lower limit temperature;
      switching off a first predetermined number of the heating units and waiting a predetermined period of time, then obtaining a second temperature reading, responsive to a temperature reading reaching a selected upper limit temperature on the rise;
      switching off substantially all of the remaining heating units, responsive to the second temperature reading still being above the upper limit temperature; and
      switching on a second predetermined number of heating units responsive to the temperature reading reaching the upper limit temperature on the fall.

2. The locomotive cab heating system of claim 1 wherein the program is continuously repeated during an operational cycle of the fan.

3. The locomotive cab heating system of claim 1 wherein the temperature sensor is a thermistor.

4. The locomotive cab heating system of claim 1 including a return air duct from the locomotive cab to the inlet of the fan.

5. The locomotive cab heating system of claim 1 further comprising a fan speed control mounted in an associated cab.

6. The locomotive cab heating system of claim 1 including a separate shutdown temperature sensor connected to a circuit breaker such that power to the heating system is interrupted by the circuit breaker when a predetermined shutdown temperature is read by the shutdown temperature sensor.

7. The locomotive cab heating system of claim 6 wherein the shutdown temperature sensor is a thermostat.

8. The locomotive cab heating system of claim 6 wherein the shutdown temperature is approximately 180° F. (82° C.).

9. The locomotive cab heating system of claim 6 wherein the program is configured to run the fan for a predetermined time period following normal shutdown to prevent tripping the circuit breaker from latent heat.

10. The locomotive cab heating system of claim 1 wherein the upper limit temperature is approximately 145° F. (63° C.).

11. The locomotive cab heating system of claim 1 wherein the lower limit temperature is 135° F. (57° C.).

12. The locomotive cab heating system of claim 1 wherein the predetermined period of time is approximately 20 to 30 seconds.

13. The locomotive cab heating system of claim 1 wherein the microcontroller includes an EEPROM for storing the program.

14. The locomotive cab heating system of claim 1 wherein the fan includes a blower control.

15. The locomotive cab heating system of claim 14 wherein the microcontroller receives discrete switch inputs from the blower control and analog inputs from the temperature sensor, and wherein the microcontroller is programmed to convert the analog input to a digital signal.

16. The locomotive cab heating system of claim 14 wherein the fan blower control is mounted inside an associated locomotive cab.

17. The locomotive cab heating system of claim 1 wherein the predetermined number of heating units is approximately ⅓ of the total number of heating units.

18. The locomotive cab heating system of claim 1 wherein the second predetermined number of heating units is approximately ⅔ the total number of heating units.

19. The locomotive cab heating system of claim 1 wherein the first predetermined number of heating units is 2 units.

20. The locomotive cab heating system of claim 1 wherein the second predetermined number of heating units is 4 units.

21. The locomotive cab heating system of claim 1 wherein the plurality of the heating units comprises 6 units.

22. The locomotive cab heating system of claim 1 wherein the temperature sensor sampling time is approximately 5 milliseconds.

23. A method for controlling a microcontroller to turn heating units on and off in a supply air duct to a locomotive cab in order to maintain air temperature within the duct within a specified range using a stored program, the program actuating the microcontroller to perform a routine comprising the steps of:

obtaining a temperature reading from a temperature sensor;

switching on substantially all of the heating units responsive to a duct air temperature reading being below a lower limit temperature;

switching off a first predetermined number of the heating units and waiting a predetermined period of time, then obtaining a second temperature reading, responsive to the duct air temperature reading reaching an upper limit temperature on the rise;

switching off substantially all of the remaining heating units, responsive to the second duct air temperature reading remaining above the upper limit temperature; and switching on a second predetermined number of heating units responsive to the duct air temperature reading reaching the upper limit temperature on the fall.

* * * * *